United States Patent Office.

ERNEST LESLIE RANSOME, OF GREENWICH, ENGLAND.

Letters Patent No. 108,627, dated October 25, 1870.

IMPROVEMENT IN REMOVING SOLUBLE SALTS FROM ARTIFICIAL STONE.

The Schedule referred to in these Letters Patent and making part of the same.

*To all whom it may concern:*

Be it known that I, ERNEST LESLIE RANSOME, of Greenwich, in the county of Kent, England, a subject of the Queen of Great Britain, have invented and discovered a new and useful Improvement in the Manufacture of Artificial Stone, and having particular reference to that manufactured by Ransome's process.

As at present manufactured, the Ransome artificial stone leaves the boiling-tank saturated with undecomposed chloride of calcium mixed with chloride of sodium. It is then subjected to purging by means of water applied in various ways, but in all of them the chloride of calcium and chloride of sodium are so diluted as to be almost entirely lost.

My invention has a threefold object:

First, it saves time in the purifying and washing.

Second, it is a cheaper method than washing by water.

Third, it saves from loss all excess of chloride of calcium and chloride of sodium.

The block of stone to be purged and washed having been placed, in a suitable position, either in a closed chamber or open, or upon a floor or other support, I then pass a current of steam into and through the same by any convenient means, such as have been hitherto used for the same purpose when water alone was employed, or by many of the methods now used for hardening the same.

This method, valuable in any locality, especially commends itself in those where the high cost of water or its impurities are a heavy tax upon the manufacture, or a bar to it altogether, the exhaust steam being used where desirable, and involving no expense.

What I claim is—

A current of steam in removing soluble salts from, and in washing, the Ransome and other artificial stone.

ERNEST L. RANSOME. [L. S.]

Witnesses:
 JNO. L. BOONE,
 GEO. H. STRONG.